(12) United States Patent
Lee et al.

(10) Patent No.: US 10,355,332 B2
(45) Date of Patent: Jul. 16, 2019

(54) ELECTROLYTE, LITHIUM AIR BATTERY INCLUDING THE ELECTROLYTE, AND METHOD OF PREPARING THE ELECTROLYTE

(71) Applicant: Samsung Electronics Co., Ltd., Suwon-si, Gyeonggi-do (KR)

(72) Inventors: Hyunpyo Lee, Seoul (KR); Kihyun Kim, Seoul (KR); Dongjoon Lee, Suwon-si (KR); Minsik Park, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 303 days.

(21) Appl. No.: 15/235,258

(22) Filed: Aug. 12, 2016

(65) Prior Publication Data

US 2017/0054190 A1    Feb. 23, 2017

(30) Foreign Application Priority Data

Aug. 19, 2015 (KR) .......................... 10-2015-0116962

(51) Int. Cl.
| | | |
|---|---|---|
| *H01M 12/08* | (2006.01) | |
| *H01M 10/0565* | (2010.01) | |
| *H01M 10/0562* | (2010.01) | |

(52) U.S. Cl.
CPC ....... *H01M 12/08* (2013.01); *H01M 10/0562* (2013.01); *H01M 10/0565* (2013.01); *H01M 2300/0082* (2013.01); *Y02E 60/128* (2013.01)

(58) Field of Classification Search
CPC ............. H01M 12/08; H01M 10/0562; H01M 10/0565; H01M 2300/0082; Y02E 60/128
See application file for complete search history.

(56) References Cited

U.S. PATENT DOCUMENTS

2013/0330639 A1    12/2013 Lee et al.

FOREIGN PATENT DOCUMENTS

| JP | 1996031449 A | 2/1996 |
|---|---|---|
| JP | 2012056925 A | 3/2012 |
| WO | 2010083325 A1 | 7/2010 |

*Primary Examiner* — Laura Weiner
(74) *Attorney, Agent, or Firm* — Cantor Colburn LLP

(57) ABSTRACT

An electrolyte including a polymer including a repeating unit represented by Formula 1 and a lithium salt. Also a lithium air battery and a method of preparing an electrolyte.

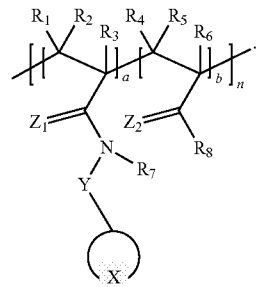

Formula 1

20 Claims, 8 Drawing Sheets

ELECTROLYTE, LITHIUM AIR BATTERY INCLUDING THE ELECTROLYTE, AND METHOD OF PREPARING THE ELECTROLYTE

CROSS-REFERENCE TO RELATED APPLICATION

This application claims the benefit of and priority to Korean Patent Application No. 10-2015-0116962, filed on Aug. 19, 2015, in the Korean Intellectual Property Office and all the benefits accruing therefrom under 35 U.S.C. § 119, the content of which is incorporated herein in its entirety by reference.

BACKGROUND

1. Field

The present disclosure relates to an electrolyte, a lithium air battery including the electrolyte, and a method of preparing the electrolyte.

2. Description of the Related Art

A lithium air battery includes an anode capable of incorporating and deincorporating lithium ions, a cathode that oxidizes and reduces oxygen in the air, and a separator disposed between the cathode and the anode.

The lithium air battery uses lithium metal as an anode and air as a cathode active material, and thus the cathode active material does not need to be stored within the battery. Because the cathode active material does not need to be stored in the battery, the lithium air battery may have a high energy density. Lithium air batteries have a high theoretical specific energy of 3,500 Watt-hours per kilogram (Wh/kg) or greater, which is about ten times greater than that of a lithium ion battery.

SUMMARY

Provided is an electrolyte including a polymer.

Provided is a lithium air battery including the electrolyte.

Provided is a method of preparing the electrolyte.

Additional aspects will be set forth in part in the description which follows and, in part, will be apparent from the description, or may be learned by practice of the presented exemplary embodiments.

According to an aspect of an exemplary embodiment, an electrolyte includes a polymer including a repeating unit represented by Formula 1; and a lithium salt:

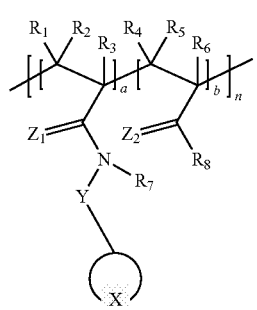

Formula 1 wherein, in Formula 1,

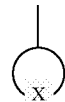

is a 5- to 31-membered group including X, 1 to 30 carbon atoms, and optionally at least one heteroatom,
  wherein the 5- to 31-membered group includes an unsubstituted or substituted C1-C30 cycloalkyl ring, an unsubstituted or substituted C1-C30 heterocycloalkyl ring, an unsubstituted or substituted C6-C30 aryl ring, or an unsubstituted or substituted C2-C30 heteroaryl ring,
  X is —S(=O)$_2$—, —O—S(=O)$_2$—O—, —O—S(=O)$_2$—, —S(=O)$_2$—O—C(=O)—O—S(=O)$_2$—, or —S(=O)$_2$—O—S(=O)—O—S(=O)$_2$—,
  $Z_1$ and $Z_2$ are each independently O or S,
  Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,
  $R_1$ to $R_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group,
  $0 < a \leq 1$, $0 \leq b \leq 1$, and a+b=1, and
  n is an integer of 2 to 1000.

According to an aspect of another exemplary embodiment, a lithium air battery includes a cathode; an anode; and an electrolyte layer disposed between the cathode and the anode, wherein, at least one of the cathode and the electrolyte layer includes the electrolyte.

According to an aspect of another exemplary embodiment, a method of preparing an electrolyte includes polymerizing a composition including a first monomer represented by Formula 6 to prepare a polymer; and contacting the polymer and a lithium salt together to prepare an electrolyte:

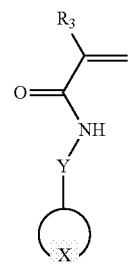

Formula 6 wherein, in Formula 6,

is represented by one selected from the group consisting of Formulae 2-1 to 2-8:

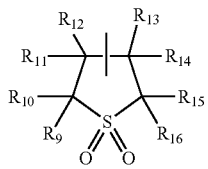
Formula 2-1

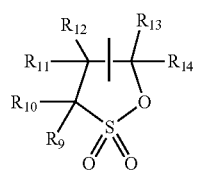
Formula 2-2

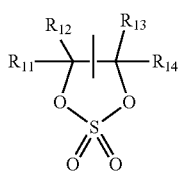
Formula 2-3

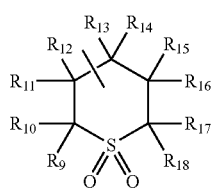
Formula 2-4

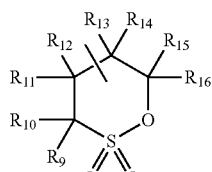
Formula 2-5

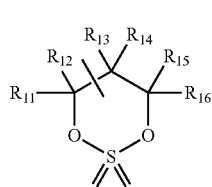
Formula 2-6

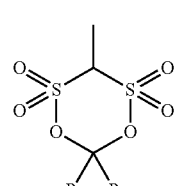
Formula 2-7

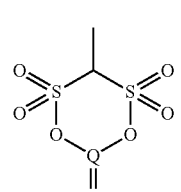
Formula 2-8 wherein, in Formulae 2-1 to 2-8,

Q is C or S, and $R_9$ to $R_{20}$ are each independently a covalent bond, a hydrogen atom, a halogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group, and $R_3$ is a hydroxyl group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
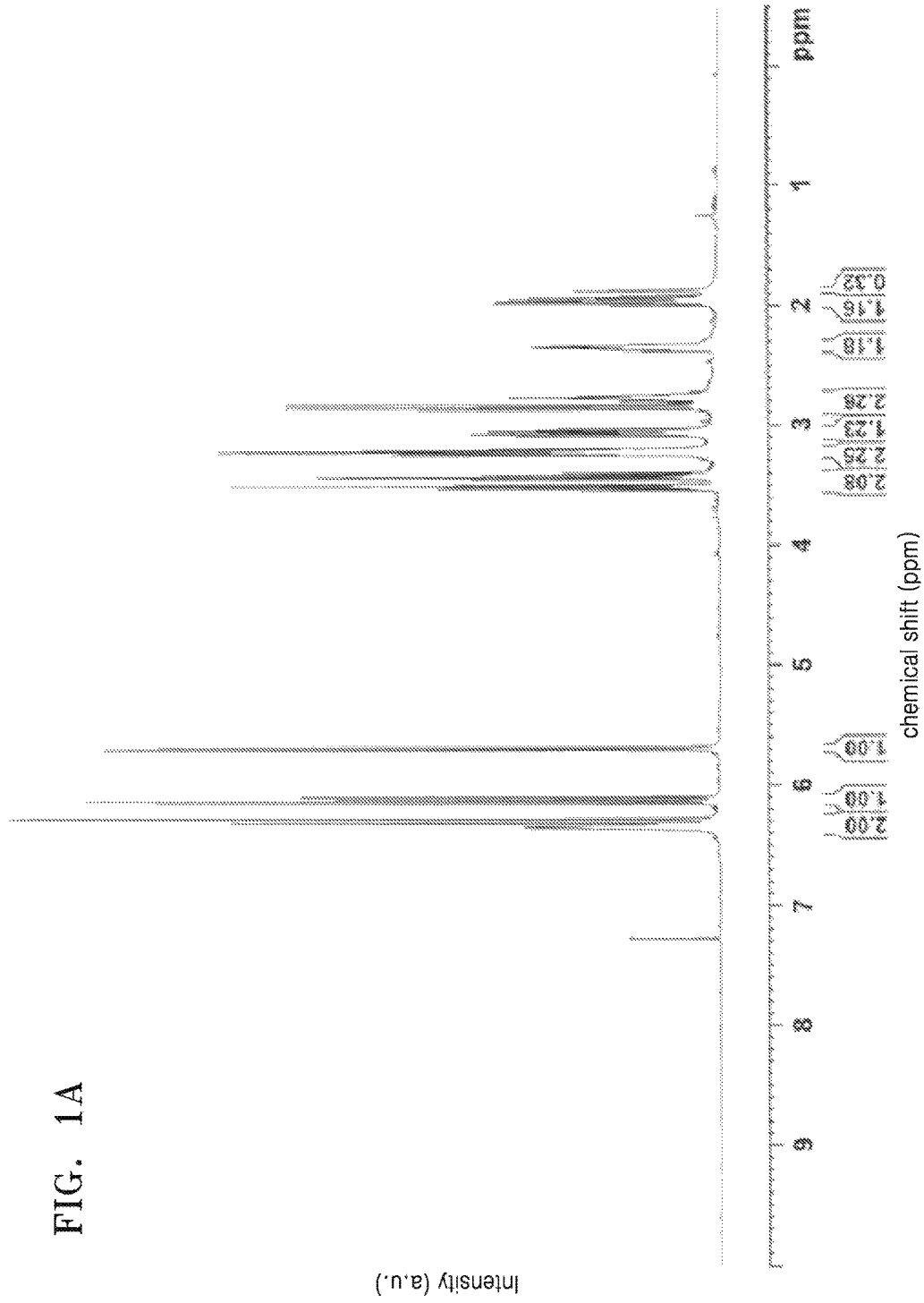
FIG. 1A is a graph of intensity (arbitrary units, a.u.) versus chemical shift (parts per million versus tetramethyl silane, ppm) and is an NMR spectrum of a monomer used in Example 1.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A polymer electrolyte used in the lithium air battery may include a polymer, such as polyethylene oxide (PEO) or poly(methyl methacrylate) (PMMA). However, the polymer reacts with oxygen and thus dissociates after exposure in the air for a long period of time. Also, the polymer dissociates when it reacts with lithium peroxide (Li$_2$O$_2$) that is generated during discharging of the lithium air battery.

Therefore, a polymer with a high stability with respect to air and lithium peroxide is needed.

Hereinafter, according to exemplary embodiments, an electrolyte, a lithium air battery including the electrolyte, and a method of preparing the electrolyte will be described in further detail.

The electrolyte according to an exemplary embodiment includes a polymer including a repeating unit represented by Formula 1 and a lithium salt:

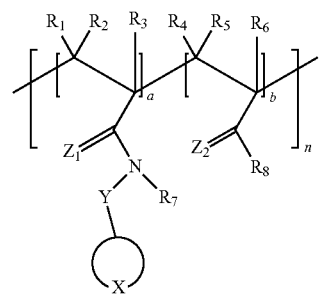

In Formula 1,

is a 5- to 31-membered group including X, 1 to 30 carbon atoms, and optionally, at least one heteroatom; wherein the 5- to 31-membered group includes an unsubstituted or substituted C1-C30 cycloalkyl ring, an unsubstituted or substituted C1-C30 heterocycloalkyl ring, an unsubstituted or substituted C6-C30 aryl ring, or an unsubstituted or substituted C2-C30 heteroaryl ring; X is —S(═O)$_2$—, —O—S(═O)$_2$—O—, —O—S(═O)$_2$—, —S(═O)$_2$—O—C(═O)—O—S(═O)$_2$—, or —S(═O)$_2$—O—S(═O)—O—S(═O)$_2$—; $Z_1$ and $Z_2$ are each independently O or S; Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group; $R_1$ to $R_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; 0<a≤1, 0≤b≤1, and a+b=1; and n is an integer of 2 to 1000.

The polymer represented by Formula 1 has an acrylamide backbone and thus may have improved thermal resistance and chemical resistance compared to other conventional polymers having a polyethyleneoxide backbone or an acrylate backbone. Further, the polymer represented by Formula 1 includes a stable polar group linked to the acrylamide backbone and thus may provide improved ion conductivity without a decrease in its stability. Therefore, an electrolyte including the polymer represented by Formula 1 may simultaneously provide thermal and chemical stability and ion conductivity.

In an exemplary embodiment, in Formula 1, n may be in a range of about 10 to about 500. In an exemplary embodiment, in Formula 1, n may be in a range of about 10 to about 250. In an exemplary embodiment, in Formula 1, n may be in a range of 20 to 250.

In an exemplary embodiment, in the electrolyte,

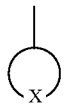

of Formula 1 may be represented by one selected from the group consisting of Formulae 2-1 to 2-8:

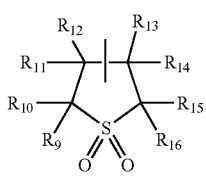

Formula 2-1

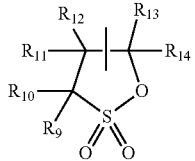

Formula 2-2

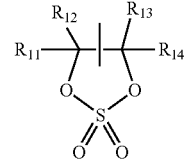

Formula 2-3

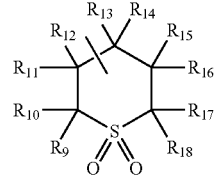

Formula 2-4

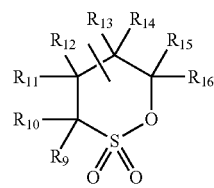

Formula 2-5

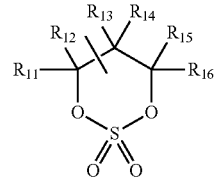

Formula 2-6

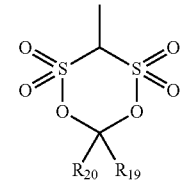

Formula 2-7

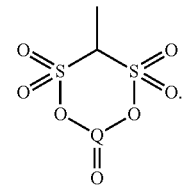

Formula 2-8

In Formulae 2-1 to 2-8, Q is C or S, and R9 to R20 are each independently a covalent bond, a hydrogen atom, a halogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

In an exemplary embodiment, in the electrolyte,

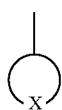

is a polar group, and in Formula 1 may be represented by one selected from the group consisting of Formula 3-1 to 3-9, but embodiments are not limited thereto, and any group suitable for use as a stable polar group may be used:

Formula 3-1

Formula 3-2
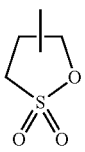

Formula 3-3
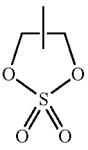

Formula 3-4
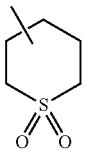

Formula 3-5
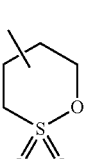

Formula 3-6
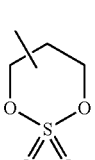

Formula 3-7
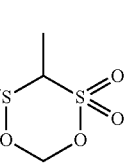

Formula 3-8
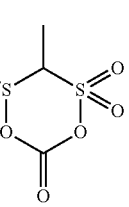

Formula 3-9
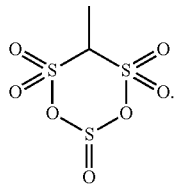

In an embodiment, in the electrolyte, a polymer including a repeating unit represented by Formula 1 may be represented by Formula 4:

Formula 4
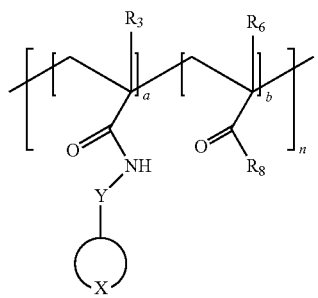

In Formula 4, Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group; $R_3$, $R_6$, and $R_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; $0 < a \le 1$, $0 \le b \le 1$, and $a+b=1$; and n is an integer of 2 to 1000.

In an embodiment, in the electrolyte, a polymer including a repeating unit represented by Formula 1 may be represented by Formula 5:

Formula 5
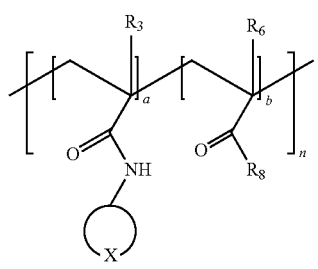

In Formula 5, $R_3$, $R_6$, and $R_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; $0<a\leq1$, $0\leq b\leq1$, and $a+b=1$; and n is an integer of 2 to 1000.

In an embodiment,

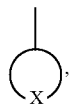

which is a polar group in Formula 5 may be represented by one selected from the groups consisting of Formula 3-1 to 3-9:

Formula 3-1

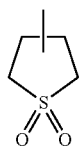

Formula 3-2

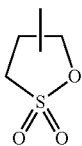

Formula 3-3

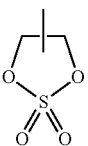

Formula 3-4

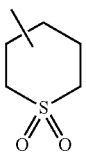

Formula 3-5

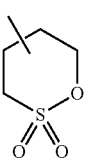

Formula 3-6

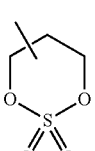

Formula 3-7

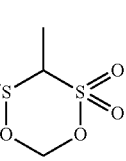

Formula 3-8

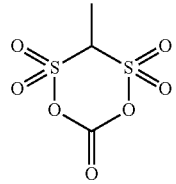

Formula 3-9

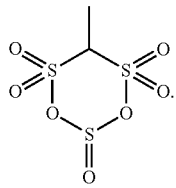

In other embodiments, in a polymer including a repeating unit of Formulae 1 to 5, $R_3$ and $R_4$ may be each independently a hydrogen atom, a methyl group, an ethyl group, a propyl group, a butyl group, or a pentyl group.

In an exemplary embodiment, in a polymer including a repeating unit of Formulae 1 to 5, $R_8$ may be a hydroxy group, a methoxy group, or an ethoxy group.

The electrolyte may further include other polymers. The other polymers may be any polymer that is suitable for use as an electrolyte. In an exemplary embodiment, the electrolyte may further include polyvinyl alcohol (PVA). However, in an exemplary embodiment, the electrolyte may not include polyethylene oxide. While not wanting to be bound by theory, in an electrolyte that does not include polyethylene oxide polymer, the thermal and chemical stability of the electrolyte may be improved.

In an exemplary embodiment, in the electrolyte, the polymer including a repeating unit of Formulae 1 to 5 may be a block copolymer or a random copolymer. In an exemplary embodiment, a polymer including a repeating unit represented by Formulae 1 to 5 may be a block copolymer including a first polymer block formed of a first repeating unit including a polar group, such as

and a second polymer block formed of a second repeating unit that does not include the polar group. In an exemplary embodiment, a polymer including a repeating unit represented by Formulae 1 to 5 may be a random copolymer randomly including a repeating unit including a polar group, such as

and a repeating unit that does not include the polar group.

In an exemplary embodiment, in the electrolyte, a weight average molecular weight of the polymer including a repeating unit represented by Formulae 1 to 5 may be in a range of about 4,000 Daltons to about 100,000 Daltons, but embodiments are not limited thereto, and the average molecular weight may be appropriately changed. In an exemplary embodiment, in the electrolyte, a weight average molecular weight of the polymer including a repeating unit represented by Formulae 1 to 5 may be in a range of about 5,000 Daltons to about 80,000 Daltons. In an exemplary embodiment, in the electrolyte, a weight average molecular weight of the polymer including a repeating unit represented by Formulae 1 to 5 may be in a range of about 6,000 Daltons to about 60,000 Daltons. In an exemplary embodiment, in the electrolyte, a weight average molecular weight of the polymer including a repeating unit represented by Formulae 1 to 5 may be in a range of about 7,000 Daltons to about 50,000 Daltons. In an exemplary embodiment, in the electrolyte, a weight average molecular weight of the polymer including a repeating unit represented by Formulae 1 to 5 may be in a range of about 8,000 Daltons to about 45,000 Daltons. When the weight average molecular weight of the polymer including a repeating unit represented by Formulae 1 to 5 is within these ranges, thermal and chemical stability and ion conductivity of the electrolyte may further improve.

In an exemplary embodiment, the glass transition temperature ($T_g$) of the polymer including a repeating unit represented by Formulae 1 to 5 in the electrolyte may be in a range of about 40° C. to about 90° C. In an exemplary embodiment, when a weight average molecular weight of the polymer including a repeating unit represented by Formulae 1 to 5 is about 15,000, a glass transition temperature ($T_g$) of the polymer may be about 61° C. In an exemplary embodiment, when a weight average molecular weight of the polymer including a repeating unit represented by Formulae 1 to 5 is about 30,000, a glass transition temperature ($T_g$) of the polymer may be about 85° C.

In an exemplary embodiment, in a thermogravimetric analysis (TGA) of the polymer in the electrolyte, a temperature at which a weight of the polymer reaches about 90% of an initial weight may be about 300° C. or higher. Since the temperature at which the initial weight of the polymer decreases about 10% may be as high as about 300° C., the polymer may have improved thermal stability. In an exemplary embodiment, in a TGA of the polymer in the electrolyte, a temperature at which a weight of the polymer reaches about 90% of an initial weight may be about 304° C. or higher. In an exemplary embodiment, in a TGA of the polymer in the electrolyte, a temperature at which a weight of the polymer reaches about 90% of an initial weight may be about 310° C. or higher. In an exemplary embodiment, in a TGA of the polymer in the electrolyte, a temperature at which a weight of the polymer reaches about 90% of an initial weight may be about 320° C. or higher. In an exemplary embodiment, in a TGA of the polymer in the electrolyte, a temperature at which a weight of the polymer reaches about 90% of an initial weight may be about 330° C. or higher. In an exemplary embodiment, in a TGA of the polymer in the electrolyte, a temperature at which a weight of the polymer reaches about 90% of an initial weight may be about 340° C. or higher.

In the electrolyte, the polymer may be inert with respect to the air and lithium peroxide. For example, a molecular weight of the polymer may not change after mixing and stirring the polymer with $Li_2O_2$ for 3 days in the air. Since the polymer is inert with respect to the air and lithium peroxide, the chemical stability of the electrolyte including the polymer may improve, and the lifespan characteristics of a lithium air battery including the electrolyte may improve. In an exemplary embodiment, the polymer is inert when the molecular weight of the polymer, as analyzed by Gel permeation chromatography, has a molecular weight change of less than about _1_wt % when contacted with $Li_2O_2$ at 20° C. for 3 days in the air. In an exemplary embodiment, a molecular weight of the polymer, as analyzed by Gel permeation chromatography, has a molecular weight change of less than about 0.5 wt % when contacted with $Li_2O_2$ at 20° C. for 4 days in the air. In an exemplary embodiment, the molecular weight of the polymer, as analyzed by gel permeation chromatography, has a molecular weight change of less than about 0.1 wt % when contacted with $Li_2O_2$ at 20° C. for 5 days in the air. In an exemplary embodiment, the molecular weight of the polymer, as measured by Gel permeation chromatography, has a molecular weight change of less than about 0.01 wt % when contacted with $Li_2O_2$ at 20° C. for 7 days in the air.

The electrolyte may be in a solid state at a temperature of about 25° C. or less. Since the electrolyte includes a polymer, the electrolyte may be solid at room temperature. In an exemplary embodiment, the electrolyte may be a solid at a temperature of about 30° C. or less. In an exemplary embodiment, the electrolyte may be a solid at a temperature of about 35° C. or less. In an exemplary embodiment, the electrolyte may be a solid at a temperature of about 40° C. or less. In an exemplary embodiment, the electrolyte may be a solid at a temperature of about 45° C. or less. In an exemplary embodiment, the electrolyte may be a solid at a temperature of about 50° C. or less. That is, the electrolyte may be a solid polymer electrolyte, which is a solid at room temperature.

Since the electrolyte is solid, a structure of a lithium air battery may be simple. Also, problems, such as leakage, may not occur, and thus stability of a lithium air battery may improve.

An In an exemplary embodiment, the ion conductivity of the electrolyte may be about $1\times10^{-9}$ Siemens per centimeter (S/cm) or greater at 25° C. When an ion conductivity of the electrolyte is about $1\times10^{-9}$ S/cm or greater at 25° C., lithium ions may be transferred within the lithium air battery. In an exemplary embodiment, an ion conductivity of the electrolyte may be about $1\times10^{-8}$ S/cm or greater at 25° C. In an exemplary embodiment, an ion conductivity of the electrolyte may be about $1\times10^{-7}$ S/cm or greater at 25° C. In an exemplary embodiment, an ion conductivity of the electrolyte may be about $1\times10^{-6}$ S/cm or greater at 25° C. In an exemplary embodiment, an ion conductivity of the electrolyte may be about $1\times10^{-5}$ S/cm or greater at 25° C. In an exemplary embodiment, an ion conductivity of the electrolyte may be about $1\times10^{-4}$ S/cm or greater at 25° C. In an exemplary embodiment, an ion conductivity of the electrolyte may be about $2\times10^{-4}$ S/cm or greater at 25° C. In an exemplary embodiment, an ion conductivity of the electrolyte may be about $5\times10^{-4}$ S/cm or greater at 25° C.

The electrolyte may be a solvent-free electrolyte. In an exemplary embodiment, the electrolyte may be a solid polymer electrolyte that does not include a solvent and is formed of a polymer and a lithium salt. When the electrolyte does not include a solvent, problems related to a solvent, such as side reactions or leakage, may be avoided. A content of a solvent in the solvent free electrolyte may be less than 1 weight percent (wt %), less than 0.5 wt %, or less than 0.1 wt %, based on a total weight of the electrolyte.

The solvent free electrolyte is different from a polymer gel electrolyte, in which a solid polymer includes a small amount of a solvent. For example, in the polymer gel electrolyte, an ion conductive polymer includes a small amount of solvent, and thus the polymer gel electrolyte may have increased ion conductivity.

Alternatively, the electrolyte may be a solvent-containing electrolyte. The solvent-containing electrolyte may be an aqueous electrolyte including an aqueous solvent or a non-aqueous electrolyte including an organic solvent.

The non-aqueous (or organic) electrolyte may include an aprotic solvent. The aprotic solvent may be, for example, a carbonate-based solvent, an ester-based solvent, an ether-based solvent, a ketone-based solvent, or an alcohol-based solvent. The carbonate-based solvent may be, for example, dimethyl carbonate (DMC), diethyl carbonate (DEC), ethylmethyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), butylenes carbonate (BC), or tetraethyleneglycoldimethylether (TEGDME). The ester-based solvent may be, for example, methyl acetate, ethyl acetate, n-propyl acetate, dimethylacetate, methylpropionate, ethylpropionate, γ-butyrolactone, decanolide, valerolactone, mevalonolactone, or caprolactone. The ether-based solvent may be, for example, dibutyl ether, tetraglyme, diglyme, dimethoxyethane, 2-methyltetrahydrofuran, or tetrahydrofuran. The ketone-based solvent may be, for example, cyclohexanone. Also, the alcohol-based solvent may be, for example, ethyl alcohol or isopropyl alcohol. The aprotic solvent is not limited to the above examples and any suitable aprotic solvent may be used.

Further, the aprotic solvent may be a nitrile such as R—CN (wherein R is a straight, branched, or cyclic hydrocarbon group containing 2 to 20 carbon atoms which may include a double-bond aromatic ring or an ether bond), an amide such as dimethylformamide, a dioxolane such as 1,3-dioxolane, or a sulfolane.

The aprotic solvent may be used alone or as a mixture thereof, and when the aprotic solvent is a mixture, a mixing ratio may be appropriately changed according to the desired battery performance.

The electrolyte includes a lithium salt. The lithium salt dissolves in an organic solvent and may serve as a source of lithium ions in a battery. For example, the lithium salt may catalyze movement of lithium ions between a cathode and an anode.

An anion of the lithium salt included in the electrolyte may include at least one of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (where, x is a natural number), $(C_xF_{2x+1}SO_2)(C_yF_{2y+1}SO_2)N^-$ (where, x and y are a natural number), and a halide.

In an exemplary embodiment, the lithium salt included in the electrolyte may include one or at least two of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are 1 to 30), LiF, LiBr, LiCl, LiI, $LiB(C_2O_4)_2$ (lithium bis(oxalato) borate; LiBOB), lithium bis(trifluoromethanesulfonyl)imide (LiTFSI), and $LiNO_3$. but embodiments are not limited thereto, and any suitable material available as a lithium salt may be used.

In the solvent-free electrolyte, an amount of the lithium salt may be in a range of about 0.001 wt % to about 30 wt % based on the total weight of the solvent-free electrolyte, but the amount of the lithium salt is not limited thereto, and the amount of the lithium salt may be within any range that enables the electrolyte to facilitate the transfer of lithium ions and/or electrons during charging/discharging of the battery.

In the solvent-containing electrolyte, an amount of the lithium salt may be in a range of about 100 millimolar (mM) to about 10 molar (M). In an exemplary embodiment, the amount of the lithium salt may be in a range of about 500 mM to about 2 M. However, the amount of the lithium salt is not limited thereto, and the amount of the lithium salt may be within any range that enables the electrolyte to facilitate the transfer of lithium ions and/or electrons during charging/discharging of the battery.

According to another exemplary embodiment, a lithium air battery includes a cathode; an anode; and an electrolyte layer disposed between the cathode and the anode, wherein at least one of the cathode and the electrolyte layer includes the electrolyte described above. When the lithium air battery includes the electrolyte, the thermal stability and chemical stability of the battery may improve. Also, lifespan characteristics of the lithium air battery may improve.

In the lithium air battery, the anode may include a lithium metal, a lithium metal-based alloy, and/or a material capable of intercalating or deintercalating lithium, but the anode is not limited thereto, and any material that includes lithium or is capable of intercalating or deintercalating lithium may be used as an anode. The anode determines a capacity of the lithium air battery, and thus the anode may be, for example, a lithium metal. In an exemplary embodiment the lithium metal-based alloy may include an alloy of lithium and, for example, aluminum, tin, indium, calcium, titanium, or vanadium.

In the lithium air battery, the electrolyte layer may include a separator. The separator may have any composition that is durable within a usage range of the lithium air battery, and examples of the separator may include a non-woven fabric formed of a polypropylene material, a polymer non-woven fabric formed of a polyphenylene sulfide material, and a porous film of an olefin-based resin such as polyethylene or polypropylene, and the separator may be used in a combination of two or more selected therefrom.

The lithium air battery may further include a lithium ion conductive solid electrolyte layer on at least one surface of the cathode and/or the anode. For example, the lithium ion conductive solid electrolyte layer serves as a protection layer that prevents the lithium of the anode from directly reacting with impurities such as moisture and/or oxygen that may be present the air.

In an exemplary embodiment, the lithium ion conductive solid electrolyte layer may include a lithium ion conductive glass, a lithium ion conductive crystal (ceramic or glass-ceramic), or a mixture thereof, but the lithium ion conductive solid electrolyte layer is not limited thereto, and any material that has both lithium ion conductivity and that may protect a cathode and/or an anode and that is available as a solid electrolyte layer may be used. In an exemplary embodiment, the lithium ion conductive solid electrolyte layer may be a lithium ion conductive oxide.

In an exemplary embodiment, the lithium ion conductive crystal may include $Li_{1+x+y}(Al, Ga)_x(Ti, Ge)_{2-x}Si_yP_{3-y}O_{12}$ (where, x and y satisfy $0 \le x \le 1$ and $0 \le y \le 1$, or, for example, $0 \le x \le 0.4$ and $0 < y \le 0.6$, or, for example, $0.1 \le x \le 0.3$ and $0.1 < y \le 0.4$). In an exemplary embodiment, the lithium ion conductive glass-ceramic may include at least one of a lithium-aluminum-germanium-phosphate (LAGP), a lithium-aluminum-titanium-phosphate (LATP), and a lithium-aluminum-titanium-silicon-phosphate (LATSP).

The lithium ion conductive solid electrolyte layer may further include an inorganic solid electrolyte component in addition to glass-ceramic components. In an exemplary embodiment, the inorganic solid electrolyte may include at least one of $Cu_3N$, $Li_3N$, and LiPON.

The lithium air battery may further include a gas diffusion layer disposed on one surface of the cathode. The air is provided to the lithium air battery by diffusion of air through the gas diffusion layer. The gas diffusion layer may be conductive. Due to the conductivity, the gas diffusion layer may be used as a cathode current collector. The gas diffusion layer may include a porous carbonaceous material or a porous metal, but a material for the gas diffusion layer is not limited thereto, and any material that is suitable for use as a conductive gas diffusion layer may be used. In an exemplary embodiment, the porous carbonaceous material may include carbon fiber non-woven fabric. In particular embodiments, the conductive carbonaceous gas diffusion layer has an energy density that is lower than a metal, and thus when a lithium air battery includes the conductive carbonaceous gas diffusion layer, the energy density of the battery may increase.

In the lithium air battery, at least one of the cathode, the electrolyte layer, and the anode may include a curved part. When at least one of the cathode, the electrolyte layer, and the anode includes a curved part, the lithium air battery may be curved once or several times so that the overall shape of the lithium air battery may be three-dimensional.

In an exemplary embodiment, the lithium air battery may be prepared as follows.

First, a cathode is prepared. In an exemplary embodiment, the cathode may be prepared as follows.

A carbonaceous material, a binder, and the electrolyte are mixed, added to an appropriate solvent, and heated to prepare the cathode slurry. Then, a surface of a current collector is coated with the cathode slurry and then dried, or, optionally, the cathode slurry is press-molded on the current collector to improve the electrode density. The current collector may be a gas diffusion layer.

Alternatively, a surface of a separator or a solid electrolyte layer may be coated with the cathode slurry and then dried, or, optionally, the cathode slurry may be press-molded on the separator or the solid electrolyte layer to improve the electrode density.

The cathode slurry may optionally include a binder. The binder may include a thermoplastic resin or a thermosetting resin. In an exemplary embodiment, the binder includes at least one of a polyethylene, a polypropylene, a polytetrafluoroethylene (PTFE), a polyvinylidene fluoride (PVDF), a styrene-butadiene rubber, a tetrafluoroethylene-perfluoroalkylvinylether copolymer, vinylidene fluoride-hexafluoropropylene copolymer, a vinylidene fluoride-chlorotrifluoroethylene copolymer, an ethylene-tetrafluoroethylene copolymer, a polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer. The above binders may be used alone or as a mixture. The binder is not limited to those listed above, and any suitable binder may be used.

The current collector may be a porous structure having a net shape or a mesh shape to increase the rate of oxygen diffusion, or the current collector may be a porous metal plate of stainless steel, nickel, or aluminum, but embodiments are not limited thereto, and any suitable current collector may be used. The current collector may be coated with an oxidation resistant metal or an alloy coating layer to prevent or reduce the oxidation of the current collector.

The cathode slurry may optionally include any suitable oxygen oxidation/reduction catalyst and/or a suitable conductive material. Also, the cathode slurry may optionally include a lithium oxide.

The conductive material may be any material that has porosity and conductivity, and an example of the conductive material may be a porous carbonaceous material. In an exemplary embodiment, the carbonaceous material includes at least one of carbon black, graphite, graphene, activated carbons, and carbon fibers. The conductive material may be a metallic conductive material such as a metal fiber or a metal mesh. Also, the conductive material may include a metallic powder that includes at least one of copper, silver, nickel, and aluminum. The conductive material may be an organic conductive material such as a polyphenylene derivative. The conductive materials may be used alone or as a mixture thereof.

Next, an anode is prepared. In an exemplary embodiment, the anode may be lithium metal as described above.

Then, an electrolyte layer is prepared. The electrolyte layer may have a structure in which a separator is impregnated with the solid polymer electrolyte. The electrolyte layer in which a separator is impregnated with the solid polymer electrolyte may be prepared by disposing a solid polymer electrolyte film on one or two surfaces of the separator and then pressing the film and the separator together. Alternatively, the electrolyte layer may be prepared by injecting a liquid electrolyte, including but not limited to a lithium salt, into the separator.

Next, the anode is disposed on one side of an external case, the electrolyte layer is disposed on the anode, and the cathode equipped with the lithium ion conductive solid electrolyte layer is disposed on the electrolyte layer. Subsequently, the porous current collector is disposed on the cathode, and a pressing member that allows air to be delivered to the air electrode is disposed on the porous current collector, thereby completing the manufacture of a lithium air battery.

The external case may include an upper part that is in contact with the anode and a lower part that is in contact with the electrode, and an insulating resin may be disposed between the upper part and the lower part to electrically insulate the electrode and the anode from each other.

The lithium air battery may be used as a primary battery or as a secondary battery. The shape of the lithium air battery may include coin, button, sheet, stack, cylinder, flat, or cone shape. The lithium air battery may also be a large-sized battery configured for use in an electric vehicle.

Figure 3A:
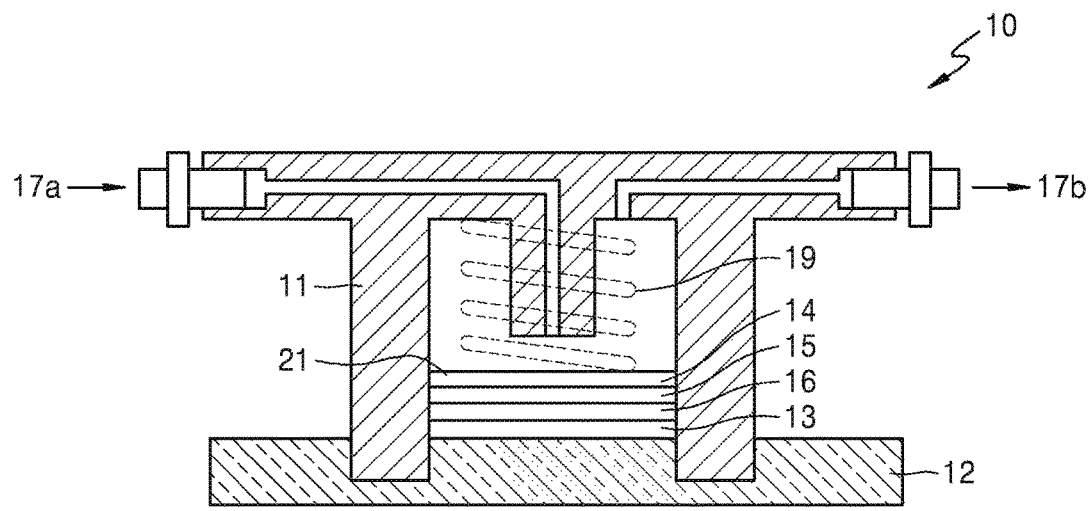
FIG. 3A is a schematic view illustrating a structure of a lithium air battery according to an exemplary embodiment.

In an exemplary embodiment, a lithium air battery 10 is schematically shown in FIG. 3A. The lithium air battery 10 includes a cathode 15 that is in contact with a first current collector 14 and uses oxygen as an active material; an anode 13 that is in contact with a second current collector 12 and includes lithium; and an electrolyte layer 16 that is disposed between the cathode 15 and the anode 13. A lithium ion conductive solid electrolyte layer (not shown) may be further disposed between the cathode 15 and the electrolyte layer 16. The first current collector 14 is porous and thus may also serve as a gas diffusion layer 21 through which the air may diffuse. A pressing member 19 that may transfer the air to the cathode 15 is disposed on the first current collector 14. An external case 11 is formed of an insulating resin material and is disposed between the cathode 15 and the anode 13 to electrically insulate the cathode 15 and the anode 13. The air is supplied through an air inlet 17a and discharged through an air outlet 17b. The lithium air battery 10 may be contained in a stainless steel container.

Figure 3B:
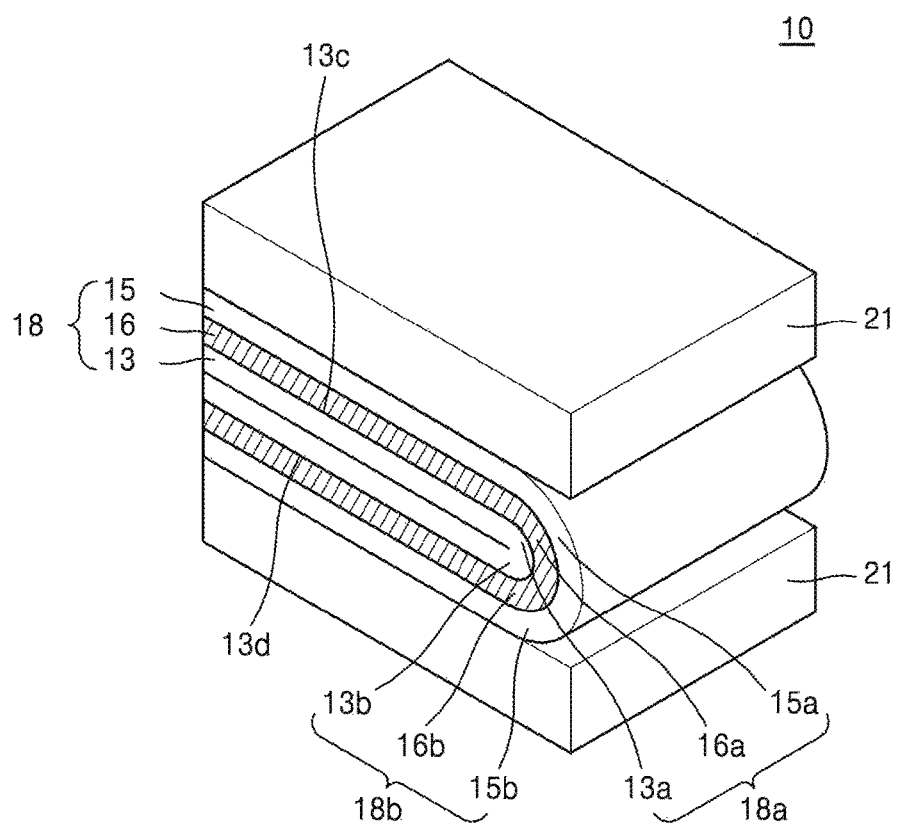
FIG. 3B is a schematic view illustrating a structure of another embodiment of a lithium air battery.

In an another exemplary embodiment, referring to FIG. 3B, in the lithium-air battery 10, the electrode-film assembly 18 may be folded at an angle of about 180° such that at least two portions of the anode 13 overlap each other. Each of a first surface 13*c* of the folded anode 13 and a second surface 13*d* opposite to the first surface 13*c* may come into contact with the composite electrolyte film 16, so that active metal ions may be transferred to the anode 13. Therefore, the discharge capacity and the energy density of the electrochemical cell 10 may be improved compared to an electrochemical cell that has the same weight as the electrochemical cell 10 and is able to transfer active metal ions only to one surface to an anode.

Referring to FIG. 3B, in an electrochemical cell 10, an electrode-film assembly 18 may include a cathode 15, an anode 13, and a composite electrolyte film 16, and the electrode-film assembly may comprise at least one folded portion, such as first and second folded portions 18*a* and 18*b* as shown in FIG. 8. The anode 13 included in the electrode-film assembly 18 may have at least one folded portion, such as first and second folded anode portions 13*a* and 13*b* as shown in FIG. 8. The cathode 15 may have one or more folded portions, such as first and second folded cathode portions 15*a* and 15*b* as shown in FIG. 8. The composite electrolyte film 16 may have at least one folded portion, such as first and second folded composite electrolyte film portions 16*a* and 16*b* as shown in FIG. 8.

Referring to FIG. 3B, in the electrochemical cell 10, the electrode-film assembly 18 may be folded at an angle of about 180° such that at least two portions of the anode 13 overlap each other. Each of a first surface 13*c* of the folded anode 13 and a second surface 13*d* opposite to the first surface 13*c* may come into contact with the composite electrolyte film 16, so that active metal ions may be transferred to the anode 13. Therefore, the discharge capacity and the energy density of the electrochemical cell 10 may be improved compared to an electrochemical cell that has the same weight as the electrochemical cell 10 and is able to transfer active metal ions only to one surface to an anode.

The term "air" as used herein is not limited to the air in the ambient atmosphere and may include a combination of gases including oxygen or pure oxygen gas. The definition of the term "air" may be applied to other uses, such as, an air battery or an air electrode.

According to another exemplary embodiment, a method of preparing an electrolyte may include polymerizing a composition including a first monomer represented by Formula 6 to prepare a polymer; and mixing the polymer and a lithium salt together to prepare an electrolyte:

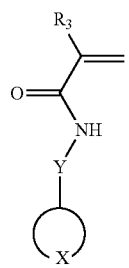

Formula 6

In Formula 6, Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group; and $R_3$ is a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

In the first monomer,

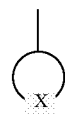

may have a structure represented by one selected from the group consisting of Formulae 2-1 to 2-8 or one selected from the group consisting of Formulae 3-1 to 3-9 as described in connection with the electrolyte.

In the method of preparing an electrolyte, the first monomer represented by Formula 6 may be prepared by reacting a monomer including an acryloyl group with an amine such as

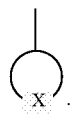

A copolymer may be prepared when the composition further includes a second monomer.

In the method of preparing an electrolyte, the composition may further include a second monomer represented by Formula 7:

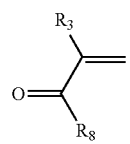

Formula 7

In Formula 7, $R_3$ and $R_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

In the method of preparing an electrolyte, the polymer composition may be prepared by solution polymerization, but embodiments are not limited thereto, and any suitable method to prepare a polymer may be used. Any suitable polymerization time and temperature may be used.

In the mixing of the polymer and the lithium salt together, an amount of the lithium salt may be in a range of about 0.001 wt % to about 30 wt %, but the amount of the lithium salt is not limited thereto and may be appropriately changed within a range that provides desirable ion conductivity. The mixing of the polymer and the lithium salt together may be performed by using any suitable mixing method.

Hereinafter are definitions of substituents used in the chemical formulas.

The term "alkyl" refers to fully saturated branched or unbranched (or straight chain or linear) hydrocarbon groups.

Non-limiting examples of an alkyl group include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

One or more hydrogen atoms of the "alkyl" may be substituted with a halogen atom, a halogen atom substituted C1-C20 alkyl group (example: $CF_3$, $CHF_2$, $CH_2F$, or $CCl_3$), a C1-C20 alkoxy group, a C2-C20 alkoxyalkyl group, a hydroxy group, a nitro group, a cyano group, an amino group, an alkylamino group, an amidino group, a hydrazine group, a hydrazone group, a carboxyl group or its salt, a sulfonyl group, a sulfamoyl group, a sulfonic acid group or its salt, a phosphoric acid group or its salt, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, a C6-C20 heteroarylalkyl group, or a combination including at least one of the foregoing, instead of hydrogen, provided that the substituted atom's normal valence is not exceeded.

The term "cycloalkyl" refers to a monovalent group having one or more saturated rings in which all ring members are carbon (e.g., cyclopentyl and cyclohexyl).

The term "heterocycloalkyl" refers to a cycloalkyl group including at least one heteroatom selected from N, O, P, Si, and S. Here, the "cycloalkyl" group is the same as defined above.

The term "halogen atom" includes fluorine, bromine, chlorine, or iodine.

The term "alkoxy" refers to alkyl-O—, and the alkyl group is the same as defined above. Non-limiting examples of an alkoxy group include methoxy, ethoxy, propoxy, 2-propoxy, butoxy, tert-butoxy, pentyloxy, hexyloxy, cyclopropoxy, and cyclohexyloxy. One or more hydrogen atoms of the alkoxy group may be substituted with one or more of the substituent groups described for the alkyl group above.

The term "aryl" refers to an aromatic hydrocarbon system containing one or more rings. Non-limiting examples of the aryl group include phenyl, naphthyl, and tetrahydronaphthyl. One or more hydrogen atoms in the aryl group may be substituted with the same substituent groups as previously described for the alkyl group above.

The term "heteroaryl" refers to a monocyclic or bicyclic organic compound that includes at least one heteroatom selected from N, O, P, Si, and S, and the remaining ring atoms are C. For example, the heteroaryl group may include 1 to 5 heteroatoms and may include 5 to 10 ring members, wherein S and N may be oxidized to various oxidation states. Non-limiting examples of a monocyclic heteroaryl group include thienyl, furyl, pyrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, or 5-pyrimidin-2-yl.

The term "heteroaryl" also refers to a group in which a heteroaromatic ring is fused to one or more aryl, cycloalkyl, or heterocycloalkyl rings.

Non-limiting examples of a bicyclic heteroaryl include indolyl, isoindolyl, indazolyl, indolizinyl, purinyl, quinolizinyl, quinolinyl, and isoquinolinyl. One or more hydrogen atoms in the heteroaryl group may be substituted with the same substituent groups as previously described for the alkyl group above.

The term "heteroaryloxy" refers to heteroaryl-O—, and the heteroaryl group is as described above.

The terms "alkylene", "arylene", "heteroarylene", "cycloalkylene", and "heterocycloalkylene" refer to substituents, in which one hydrogen atom of an alkyl group, an aryl group, a heteroaryl group, a cycloalkyl group, and a heterocycloalkyl group is substituted with a radical.

"Substituted" means a compound or radical substituted with at least one (e.g., 1, 2, 3, 4, 5, 6 or more) substituents independently selected from a halogen (e.g., $F^-$, $Cl^-$, $Br^-$, $I^-$), a hydroxyl, an alkoxy, a nitro, a cyano, an amino, an azido, an amidino, a hydrazino, a hydrazono, a carbonyl, a carbamyl, a thiol, a C1 to C6 alkoxycarbonyl, an ester, a carboxyl, or a salt thereof, sulfonic acid or a salt thereof, phosphoric acid or a salt thereof, a C1 to C20 alkyl, a C2 to C16 alkynyl, a C6 to C20 aryl, a C7 to C13 arylalkyl, a C1 to C4 oxyalkyl, a C1 to C20 heteroalkyl, a C3 to C20 heteroaryl (i.e., a group that comprises at least one aromatic ring, wherein at least one ring member is other than carbon), a C3 to C20 heteroarylalkyl, a C3 to C20 cycloalkyl, a C3 to C15 cycloalkenyl, a C6 to C15 cycloalkynyl, a C5 to C15 heterocycloalkyl, or a combination including at least one of the foregoing, instead of hydrogen, provided that the substituted atom's normal valence is not exceeded.

Thereinafter, one or more embodiments An embodiment will be disclosed in further detail with reference to the following examples. These examples are for illustrative purposes and are not intended to limit the scope of the disclosed embodiments.

EXAMPLES

Preparation of Polymer

Example 1

Poly(acrylamide-sulfolane)

In view of Reaction Scheme 1 below, 1.5 grams (g) of 3-aminomethylsulfolane was dissolved in 50 milliliters (mL) of dichloromethane, and 1 g of triethylamine was added thereto to prepare a reaction solution. The reaction solution was stirred at 0° C. for 1 hour, and 0.7 g of acryloyl chloride was slowly added thereto. Thereafter, the reaction solution was allowed to react for 12 hours, a solvent was removed therefrom using a rotary evaporator, and a monomer, as a reaction product, was purified by column chromatography using a mixture of dichloromethane and methanol at a volume ratio of 20:1.

1 g of the purified monomer was dissolved in dimethylformamide (DMF), 0.004 g of azobisisobutyronitrile (AIBN) was added thereto as a radical initiator, and the mixture was stirred for 2 days at 90° C. to allow the polymerization reaction to occur. After the polymerization was completed, the solvent was removed therefrom using a rotary evaporator, and the poly(acrylamide-sulfolane) polymer was obtained by precipitating with methanol.

A weight average molecular weight of the obtained polymer was measured with respect to a polymethylmethacylate (PMMA) standard sample by using gel permeation chromatography (GPC). A weight average molecular weight of the obtained polymer was 12,000 Daltons.

Figure 1B:
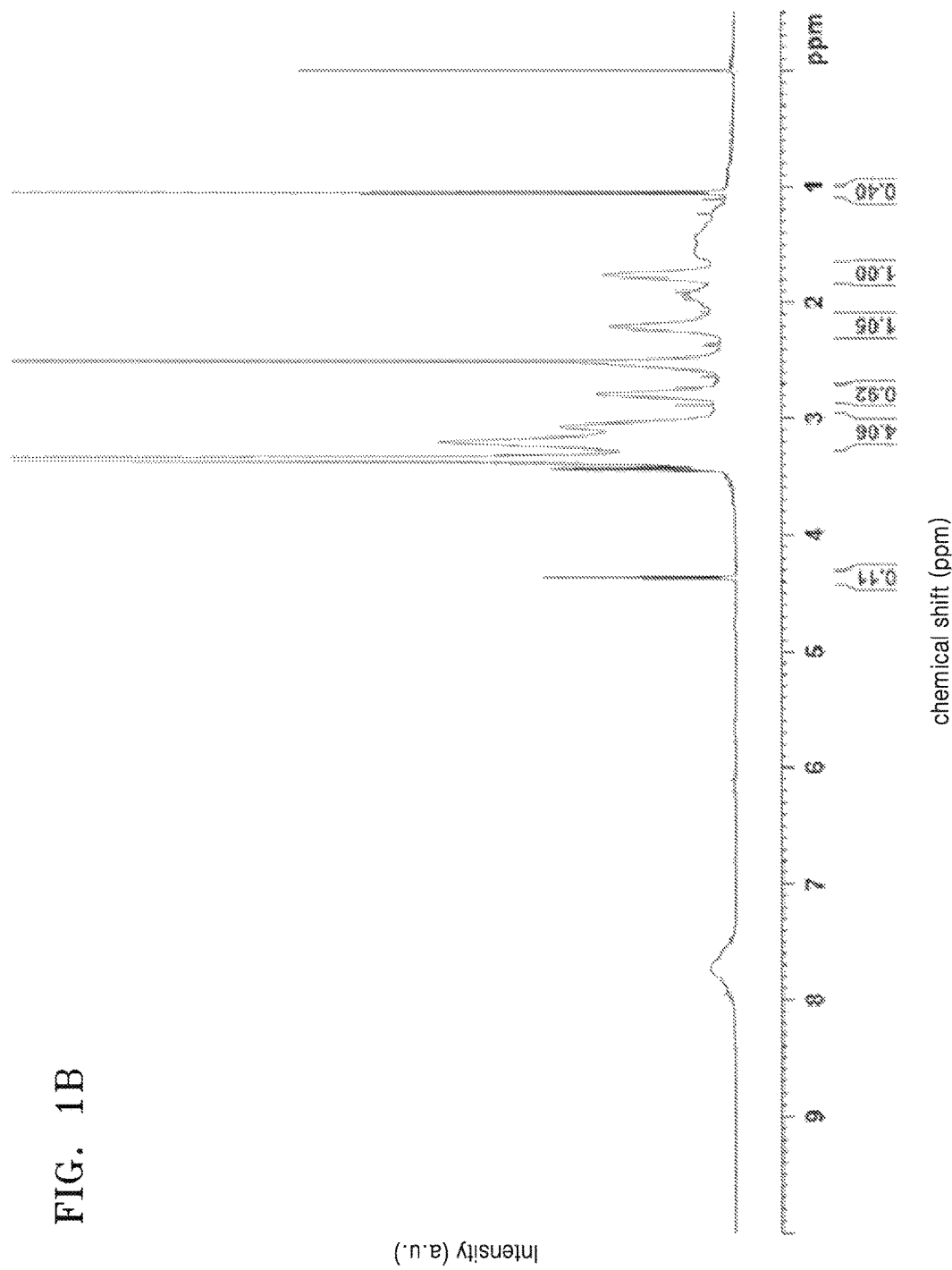
FIG. 1B is a graph of intensity (arbitrary units, a.u.) versus chemical shift (parts per million versus tetramethyl silane, ppm) and is an NMR spectrum of a polymer prepared in Example 1.

As shown in FIGS. 1A and 1B, the difference in nuclear magnetic resonance (NMR) peaks of the synthesized polymer and the monomer confirmed that the polymer was obtained. In particular, a peak corresponding to a vinyl group which appears at about 5.5 parts per million (ppm) to about 6.5 ppm of the NMR spectrum of the monomer shown in FIG. 1A was not observed in the NMR spectrum of the polymer shown in FIG. 1B. Further, a plurality of sharp peaks that appeared at about 1.5 ppm to about 3.5 ppm of the NMR spectrum of the monomer shown in FIG. 1A appeared as broad peaks in the NMR spectrum of the polymer shown in FIG. 1B.

tor, and a poly(methacrylamide-sulfolane) polymer, the polymerization product, was obtained by precipitating with methanol.

A weight average molecular weight of the prepared polymer was measured with respect to a polymethylmethacylate (PMMA) standard sample by using gel permeation chromatography (GPC). A weight average molecular weight of the prepared polymer was 19,000 Daltons.

Figure 2A:
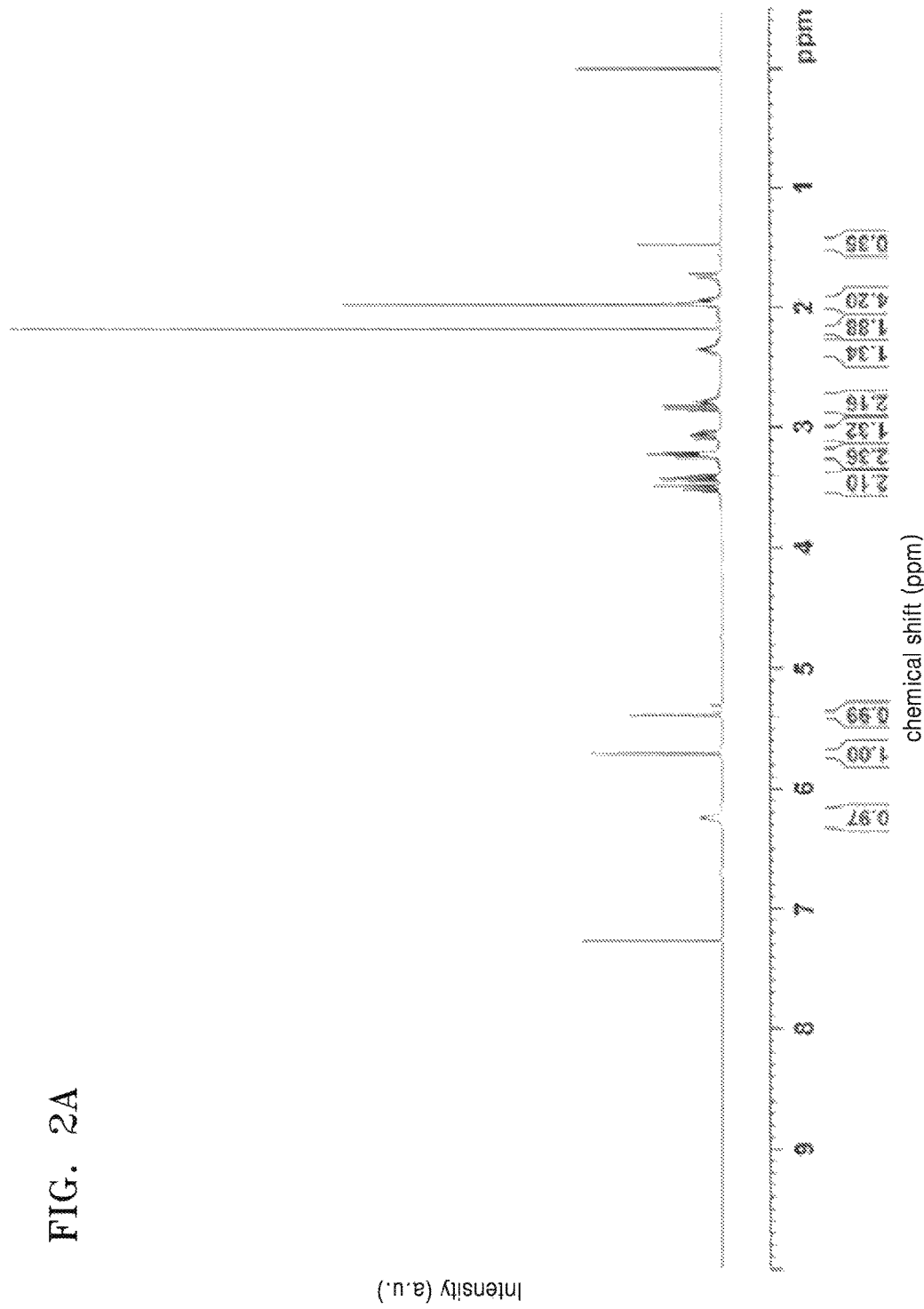
FIG. 2A is a graph of intensity (arbitrary units, a.u.) versus chemical shift (parts per million versus tetramethyl silane, ppm) and is an NMR spectrum of a monomer used in Example 2.
Figure 2B:
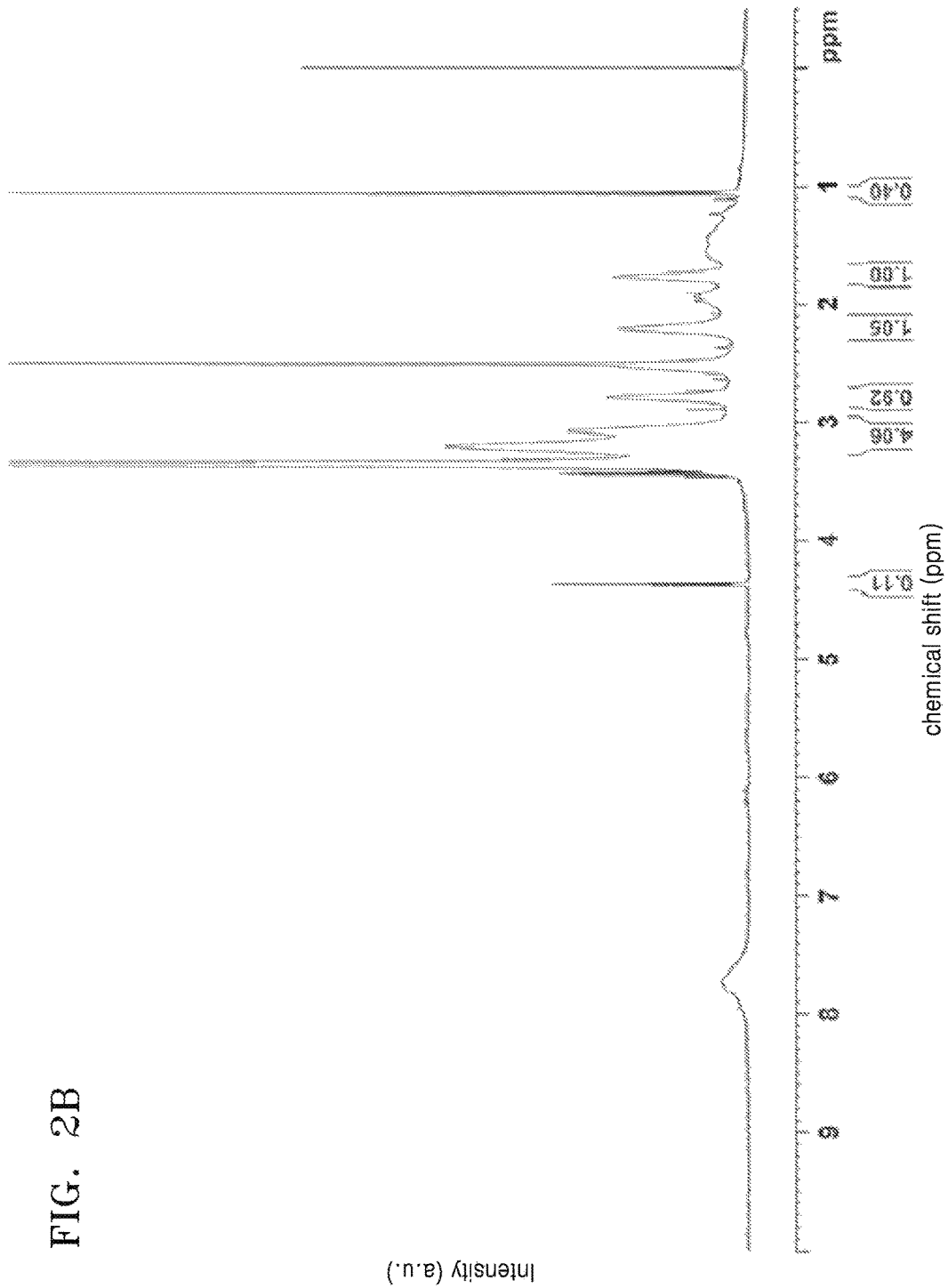
FIG. 2B is a graph of intensity (arbitrary units, a.u.) versus chemical shift (parts per million versus tetramethyl silane, ppm) and is an NMR spectrum of a polymer prepared in Example 2.

As shown in FIGS. 2A and 2B, the difference in NMR peaks between the prepared polymer and the monomer confirmed that the polymer was obtained. In particular, a peak corresponding to a vinyl group that appears at about 5.5 ppm to about 6.5 ppm of the NMR spectrum of the monomer shown in FIG. 2A was not seen in the NMR spectrum of the polymer, as shown in FIG. 2B. Also, a plurality of sharp peaks that appear at about 1.5 ppm to about 3.5 ppm of the NMR spectrum of the monomer shown in FIG. 2A, appeared as broad peaks in the NMR spectrum of the polymer shown in FIG. 2B.

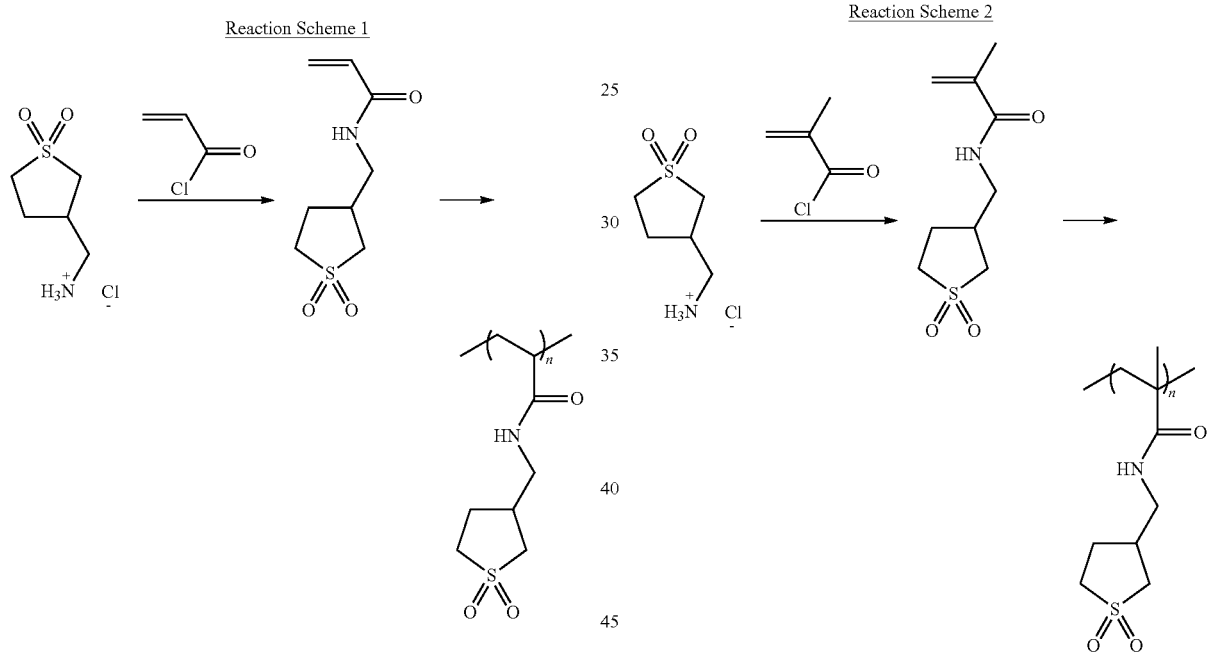

Example 2

Poly(methacrylamide-sulfolane)

In view of Reaction Scheme 2 below, 1.5 g of 3-aminomethylsulfolane was dissolved in 50 mL of dichloromethane, and 1 g of triethylamine was added thereto to prepare a reaction solution. The reaction solution was stirred at 0° C. for 1 hour, and 0.7 g of methacryloyl chloride was slowly added thereto. Thereafter, the reaction solution was allowed to react for 12 hours, a solvent was removed therefrom using a rotary evaporator, and a monomer, as a reaction product, was purified by column chromatography using a mixture of dichloromethane and methanol at a volume ratio of 20:1.

1 g of the purified monomer was dissolved in dimethylformamide (DMF), 0.004 g of azobisisobutyronitrile (AIBN) was added thereto as a radical initiator, and the mixture was stirred for 2 days at 90° C. to allow polymerization to occur. After the polymerization was completed, the solvent was removed therefrom using a rotary evapora- Comparative Example 1

Poly(ethyleneoxide)

Polyethyleneoxide (PEO600k, available from Aldrich, 182028) was used as is.

Comparative Example 2

Poly(methylmethacrylate)

Polymethylmethacrylate (Mw 15000 Daltons, available from Aldrich, 200336) was used as is.

Preparation of the Solid Electrolyte

Example 3

0.4 g of the polymer prepared in Example 1 was dissolved in 50 ml of acetonitrile to obtain a polymer solution, 0.1 g of lithium bis-trifluoromethanesulfonimide (LiTFSI) was then added thereto and dissolved while stirring the solution, and the solution was poured into a Teflon dish and dried at room temperature for 2 days. Then, the solution was vacuum dried (at 60° C. overnight) to prepare an ion conductive polymer electrolyte in the form of a film, from which residual solvent was removed. The electrolyte was solid at 25° C.

Example 4

An electrolyte was prepared in the same manner as in Example 3, except that the polymer used was the polymer prepared in Example 2. The electrolyte was solid at 25° C.

Comparative Example 3

An electrolyte was prepared in the same manner as in Example 3, except that the polymer used was the polymer prepared in Comparative Example 2. The electrolyte was solid at 25° C.
Preparation of the Cathode Example 5

The electrolyte prepared in Example 3 and a carbonaceous material (carbon black, Printex®, available from Orion Engineered Chemicals, USA) were mixed in a weight ratio of 6:1 to prepare a cathode slurry.

The cathode slurry was coated on a lithium-aluminum titanium phosphate (LATP) solid electrolyte having a thickness of 250 micrometers (μm) (available from Ohara Corp., Japan) at an amount of 3.0 mg/cm² (on an area of about 1 cm×1 cm).

Example 6

A cathode was prepared in the same manner as in Example 5, except that the electrolyte prepared in Example 4 was used.
Preparation of the Lithium-Air Battery Example 7

A separator (Celgard 3501) was disposed on a lithium metal thin film anode.

0.05 mL of 1M LiTFSI in poly(ethyleneglycol)dimethylether (PEGDME) (having a molecular weight of 500), as an electrolyte solution, was injected into the separator.

The LATP solid electrolyte coated with the cathode prepared in Example 5 was disposed on the separator so that the cathode was on the top.

Then, a gas diffusion layer (GDL) (available from SGL, 25BC) was attached on the cathode, a nickel mesh was disposed on the gas diffusion layer, and a pressing member that allows air to be transferred to the cathode was disposed thereon to press and fix the cell, thereby completing the manufacture of a lithium air battery.

An example of a structure of the lithium air battery is shown in FIG. 3.

Example 8

A lithium air battery was prepared in the same manner as in Example 7, except that the cathode prepared in Example 6 was used.

Evaluation Example 1

Evaluation of Thermal Stability

Figure 4:
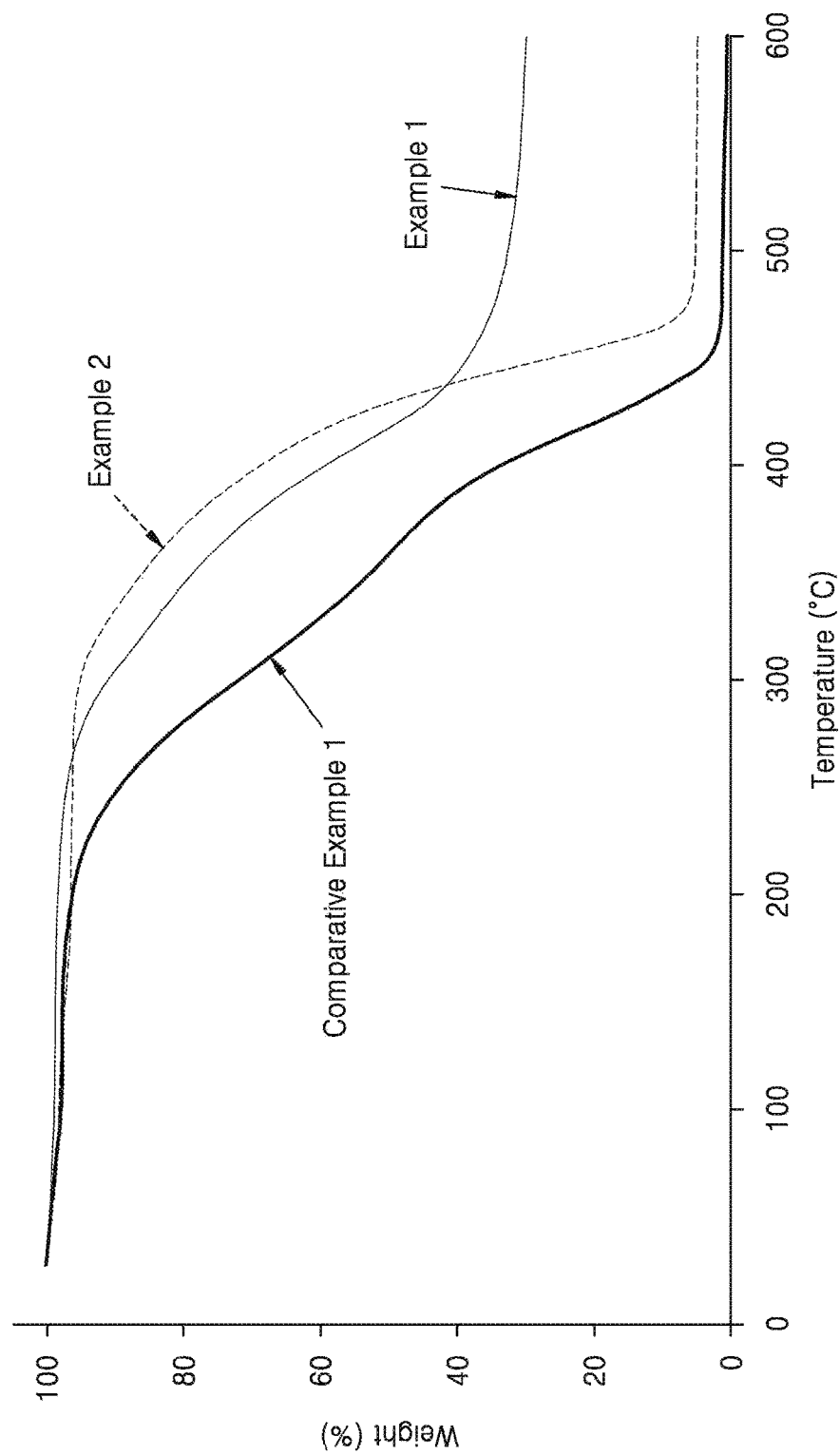
FIG. 4 is a graph of weight (%) versus temperature (° C.) and shows the results of a thermogravimetric analysis of polymers prepared in Examples 1 and 2 and Comparative Example 1.

The molecular weights of the polymers prepared in Examples 1 and 2 and the polymer prepared in Comparative Example 1 were measured in a nitrogen atmosphere by using a thermal weight measurement analysis device (TA Instrument Discovery series) using a temperature ramp rate of 10° C./min within a temperature range of room temperature to 600° C., and the results are shown in Table 1 and FIG. 4. In Table 1, 95% and 90% denote temperatures at which a weight of each of the polymers was reduced to 95% and 90% of the initial weight, respectively.

TABLE 1

|  | 95% | 90% |
| --- | --- | --- |
| Comparative Example 1 | 216.5° C. ☐ | 247.6° C. ☐ |
| Example 1 | 275.5° C. ☐ | 304.4° C. ☐ |
| Example 2 | 299.8° C. ☐ | 332.3° C. ☐ |

As shown in FIG. 4 and Table 1, the temperatures at which the weights of the polymers prepared in Examples 1 and 2 decreased by 5% and 10% were higher than the temperatures at which the weight of the polymer prepared in Comparative Example 1 decreased by 5% and 10%.

Therefore, the polymers of Examples 1 and 2 had improved thermal stability relative to that of the polymer prepared in Comparative Example 1. Further, the thermal stability of the polymer of Example 2 having a methacrylamide backbone was higher than that of the polymer of Example 1 having an acrylamide backbone.

Evaluation Example 2

Evaluation of Chemical Stability 4 mg of the polymer prepared in Example 2 and 20 mg of $Li_2O_2$ were added to 1 ml of dimethyl sulfoxide (DMSO), stirred for 3 days, and a change in molecular weight distribution of the polymer was observed by gel permeation chromatography (GPC). A similar change in the molecular weight distribution of the polymer prepared in Comparative Example 1 was observed for a sample similarly treated. The results are shown in FIGS. 5A and 5B.

Figure 5A:
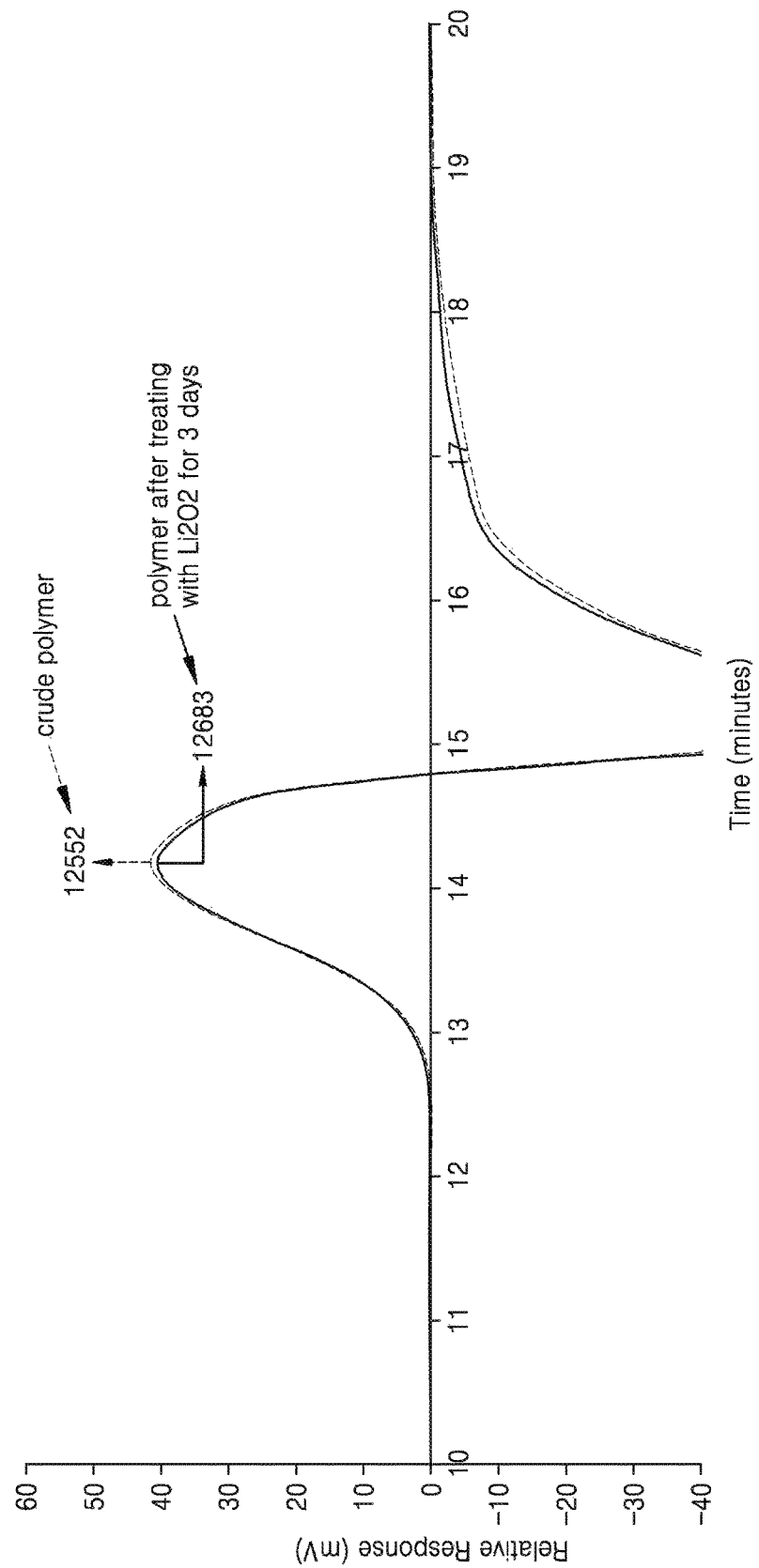
FIG. 5A is a graph of relative response (microvolts) versus time (minutes) and is a gel permeation chromatography (GPC) molecular weight distribution map before and after the polymer prepared in Example 2 contacts $Li_2O_2$.

As shown in FIG. 5A, the maximum molecular weight of the polymer of Example 2, after mixing with $Li_2O_2$ for 3 days, increased from 12552 Daltons to 12683 Daltons, which was within the margin of error for these measurements. This indicates that the polymer of Example 2 was not decomposed under these conditions.

Figure 5B:
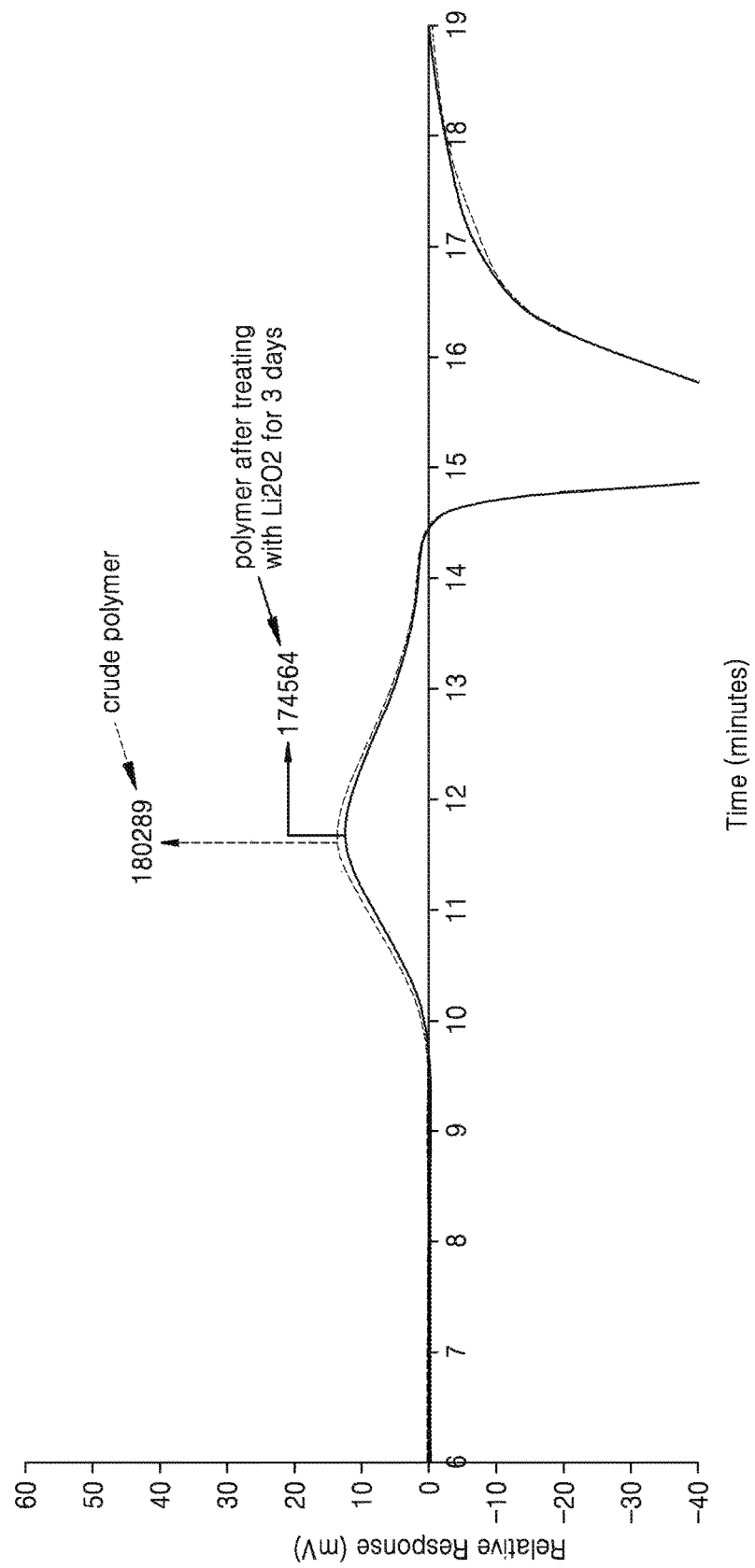
FIG. 5B is a graph of relative response (microvolts) versus time (minutes) and is a GPC molecular weight distribution map before and after the polymer prepared in Comparative Example 1 contacts Li$_2$O$_2$.

As shown in FIG. 5B, the maximum molecular weight of the polymer of Comparative Example 1, after mixing with $Li_2O_2$ for 3 days, decreased from 180289 Daltons to 174564 Daltons. This indicates that the polymer of Comparative Example 1 was at least partially decomposed.

Since the polymer of Example 2 was not decomposed by the air and $Li_2O_2$, it was determined that the polymer of Example 2 was inert with respect to the air and $Li_2O_2$ and chemically stable.

Evaluation Example 3

Evaluation of Charging/Discharging Characteristics

At a temperature of 60° C. in a 1 atmosphere (atm) oxygen atmosphere, a charging/discharging cycle was performed on each of the lithium air batteries prepared in Examples 7 and 8. The charging/discharging cycle included discharging the batteries at a constant current of 1 milliamperes per square centimeter (mA/cm$^2$) until a voltage of the batteries was 1.7 volts (V) vs. Li and then charging the batteries with at same current until a voltage of the batteries was 4.2 V vs. Li. Thus, it was confirmed that the lithium air batteries were functional.

As described above, according to the one or more of the above embodiments, a lithium air battery includes a polymer with improved thermal and chemical stability, and thus thermal and chemical stability of the lithium air battery may improve.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While an embodiment has been described with reference to the figures, it will be understood by those of ordinary skill in the art that various changes in form and details may be made therein without departing from the spirit and scope as defined by the following claims.

What is claimed is:

1. An electrolyte comprising:
 a polymer comprising a repeating unit represented by Formula 1; and
 a lithium salt,

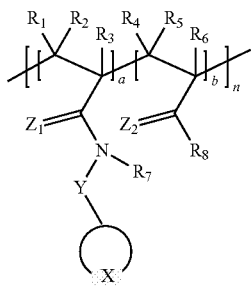

Formula 1 wherein, in Formula 1,

is a 5- to 31-membered group comprising X, 1 to 30 carbon atoms, and optionally at least one heteroatom, wherein the 5- to 31-membered group comprises an unsubstituted or substituted C1-C30 cycloalkyl ring, an unsubstituted or substituted C1- C30 heterocycloalkyl ring, an unsubstituted or substituted C6-C30 aryl ring, or an unsubstituted or substituted C2-C30 heteroaryl ring, X is —S(=O)$_2$—, —O—S(=O)$_2$—O—, —O—S(=O)$_2$—, —S(=O)$_2$—O—C(=O)—O—S(=O)$_2$—, or —S(=O)$_2$—O—S(=O)—O—S(=O)$_2$—, Z$_1$ and Z$_2$ are each independently O or S, Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group, R$_1$ to R$_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, a and b represent mole fractions of corresponding structural units of the polymer, wherein 0<a≤1, 0≤b≤1, and a+b=1, and n is an integer of 2 to 1000.

2. The electrolyte of claim 1, wherein

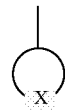

of Formula 1 is represented by one selected from the group consisting of Formulae 2-1 to 2-8:

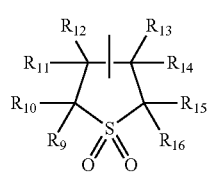

Formula 2-1

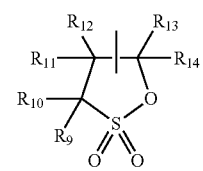

Formula 2-2

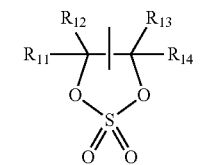

Formula 2-3

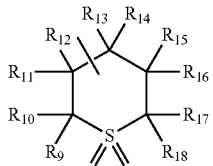

Fromula 2-4

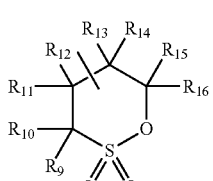

Formula 2-5

-continued

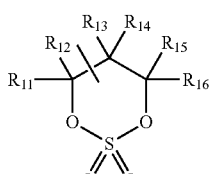
Formula 2-6

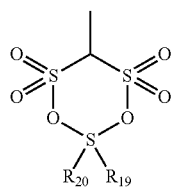
Formula 2-7

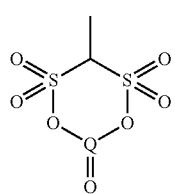
Formula 2-8 wherein, in Formulae 2-1 to 2-8,

Q is C or S, and $R_9$ to $R_{20}$ are each independently a covalent bond, a hydrogen atom, a halogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

3. The electrolyte of claim 1, wherein

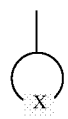

of Formula 1 is represented by one selected from the groups consisting of Formulae 3-1 to 3-9:

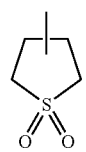
Formula 3-1

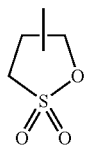
Formula 3-2

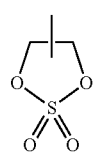
Formula 3-3

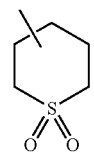
Formula 3-4

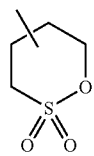
Formula 3-5

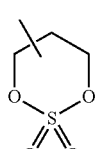
Formula 3-6

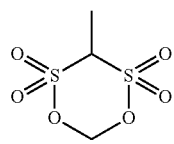
Formula 3-7

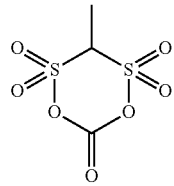
Formula 3-8

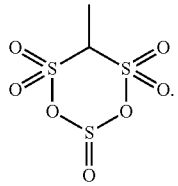
Formula 3-9

4. The electrolyte of claim 1, wherein the polymer comprising a repeating unit represented by Formula 1 is represented by Formula 4:

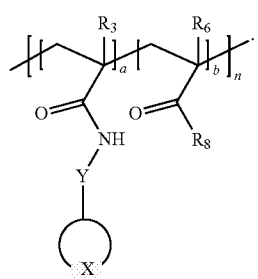
Formula 4 wherein, in Formula 4,
Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group, $R_3$, $R_6$, and $R_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, a and b represent mole fractions of corresponding structural units of the polymer, wherein 0<a≤1, 0≤b≤1, and a+b=1, and n is an integer of 2 to 1000.

5. The electrolyte of claim 4, wherein

of Formula 4 is represented by one selected from the group consisting of Formulae 3-1 to 3-9:

Formula 3-1
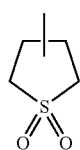

Formula 3-2
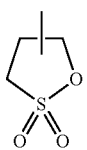

Formula 3-3
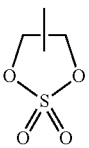

Formula 3-4
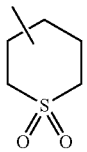

Formula 3-5
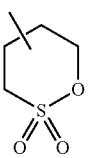

Formula 3-6
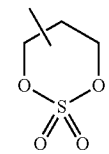

Formula 3-7
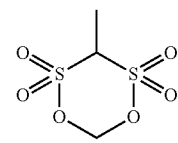

Formula 3-8
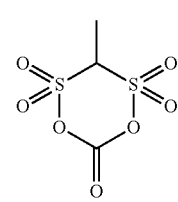

Formula 3-9
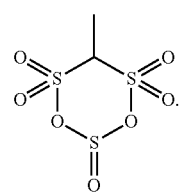

6. The electrolyte of claim 4, wherein $R_3$ and $R_4$ are each independently a hydrogen atom, a methyl group, an ethyl group, a propyl group, a butyl group, or a pentyl group.

7. The electrolyte of claim 4, wherein $R_8$ comprises at least one selected from the group consisting of a hydroxy group, a methoxy group, and an ethoxy group.

8. The electrolyte of claim 1, wherein the polymer comprises at least one selected from the group consisting of a block copolymer and a random copolymer.

9. The electrolyte of claim 1, wherein a weight average molecular weight of the polymer is in a range of about 4,000 Daltons to about 100,000 Daltons.

10. The electrolyte of claim 1, wherein, in a thermogravimetric analysis of the polymer, a temperature at which a weight of the polymer reaches 90% of an initial weight is about 300° C. to about 340° C.

11. The electrolyte of claim 1, wherein a molecular weight of the polymer has a change of greater than 0 weight percent and less than about 1 weight percent when analyzed by gel permeation chromatography, when the polymer is contacted with $Li_2O_2$ at 20° C. for 3 days in air.

12. The electrolyte of claim 1, wherein the electrolyte is solid at a temperature of about 25° C.

13. The electrolyte of claim 1, wherein the electrolyte comprises less than 1 weight percent of a solvent, based on a total weight of the electrolyte.

14. The electrolyte of claim 1, wherein the lithium salt comprises at least one selected from the group consisting of $LiPF_6$, $LiBF_4$, $LiSbF_6$, $LiAsF_6$, $LiN(SO_2F)_2$, $LiN(SO_2C_2F_5)_2$, $LiN(SO_2CF_3)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where, 3≤x≤20 and 3≤y≤20, LiF, LiBr, LiCl, LiOH, LiI, $LiB(C_2O_4)_2$, and $LiNO_3$.

15. A lithium air battery comprising
a cathode;
an anode; and
an electrolyte layer disposed between the cathode and the anode,
wherein the electrolyte layer comprises the electrolyte of claim 1.

16. The lithium air battery of claim 15, wherein the anode comprises at least one selected from the group consisting of lithium, a lithium alloy, and a metal alloyable with lithium.

17. The lithium air battery of claim 15, comprising further a gas diffusion layer disposed on a surface of the cathode.

18. The lithium air battery of claim 15, wherein at least one selected from the group consisting of the cathode, the electrolyte layer, and the anode has a folded portion.

19. A method of preparing an electrolyte of claim 1, the method comprising
polymerizing a composition comprising a first monomer represented by Formula 6 to prepare a polymer; and
contacting the polymer and a lithium salt together to prepare an electrolyte:

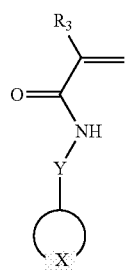

Formula 6 wherein, in Formula 6,

is represented by one selected from the group consisting of Formulae 2-1 to 2-8:

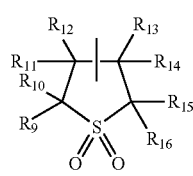

Formula 2-1

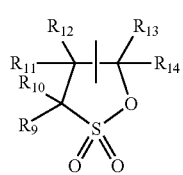

Formula 2-2

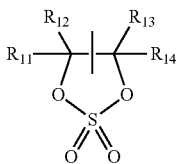

Formula 2-3

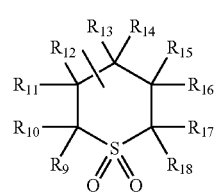

Formula 2-4

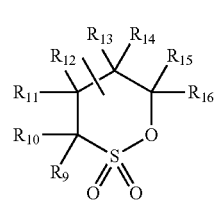

Formula 2-5

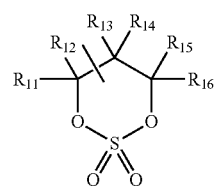

Formula 2-6

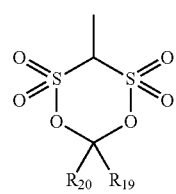

Formula 2-7

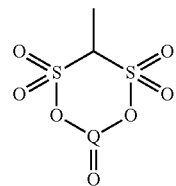

Formula 2-8 wherein, in Formulae 2-1 to 2-8,

Q is C or S, and $R_9$ to $R_{20}$ are each independently a covalent bond, a hydrogen atom, a halogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, Y is a covalent bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group, and R$_3$ is a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

20. The method of claim 19, wherein the composition further comprises a second monomer represented by Formula 7:

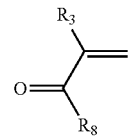

Formula 7 wherein, in Formula 7,

R$_3$ and R$_8$ are each independently a hydroxy group, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

* * * * *